(12) United States Patent
Koch et al.

(10) Patent No.: US 10,723,831 B2
(45) Date of Patent: Jul. 28, 2020

(54) POLYETHERESTERS AND THEIR USE IN RIGID POLYURETHANE FOAMS

(71) Applicant: BASF SE, Ludwigshafen am Rhein (DE)

(72) Inventors: Sebastian Koch, Lemfoerde (DE); Michele Gatti, Frick (CH); Mark Elbing, Gross Groenau (DE); Christian Koenig, Mannheim (DE); Johann Klassen, Stemwede-Oppendorf (DE)

(73) Assignee: BASF SE, Ludwigshafen am Rhein (DE)

( * ) Notice: Subject to any disclaimer, the term of this patent is extended or adjusted under 35 U.S.C. 154(b) by 136 days.

(21) Appl. No.: 15/771,533

(22) PCT Filed: Oct. 26, 2016

(86) PCT No.: PCT/EP2016/075749
§ 371 (c)(1),
(2) Date: Apr. 27, 2018

(87) PCT Pub. No.: WO2017/072152
PCT Pub. Date: May 4, 2017

(65) Prior Publication Data
US 2018/0346636 A1  Dec. 6, 2018

(30) Foreign Application Priority Data
Oct. 28, 2015 (EP) ...................... 15191987

(51) Int. Cl.
  C08G 18/18      (2006.01)
  C08G 18/20      (2006.01)
  C08G 18/40      (2006.01)
  C08G 18/42      (2006.01)
  C08G 18/48      (2006.01)
  C08G 18/50      (2006.01)
  C08G 18/76      (2006.01)
  C08J 9/14       (2006.01)
  F16L 59/00      (2006.01)
  C08G 101/00     (2006.01)

(52) U.S. Cl.
  CPC ....... *C08G 18/482* (2013.01); *C08G 18/1808* (2013.01); *C08G 18/1816* (2013.01); *C08G 18/1825* (2013.01); *C08G 18/2036* (2013.01); *C08G 18/4018* (2013.01); *C08G 18/4816* (2013.01); *C08G 18/4829* (2013.01); *C08G 18/4883* (2013.01); *C08G 18/4887* (2013.01); *C08G 18/4891* (2013.01); *C08G 18/5033* (2013.01); *C08G 18/7664* (2013.01); *C08J 9/141* (2013.01); *F16L 59/00* (2013.01); *C08G 2101/005* (2013.01); *C08G 2101/0025* (2013.01); *C08G 2330/00* (2013.01); *C08J 2203/16* (2013.01); *C08J 2205/10* (2013.01); *C08J 2375/08* (2013.01)

(58) Field of Classification Search
CPC ............ C08G 18/1808; C08G 18/1816; C08G 18/1825; C08G 18/2036; C08G 18/4816; C08G 18/482; C08G 18/4829; C08G 18/4883; C08G 18/4887; C08G 18/4891; C08G 18/5033; C08G 18/7664; C08G 2101/0025; C08G 2101/005; C08G 2330/00; C08J 9/141; C08J 2203/16; C08J 2205/10; C08J 2375/08; F16L 59/00
See application file for complete search history.

(56) References Cited

U.S. PATENT DOCUMENTS

| 9,284,401 | B2 * | 3/2016 | Lorenz ............... C08G 18/4018 |
| 2009/0082482 | A1 | 3/2009 | Schilling |
| 2012/0214891 | A1 * | 8/2012 | Gehringer ............ C08G 18/664 |
| | | | 521/172 |
| 2012/0214892 | A1 * | 8/2012 | Kunst ................ C08G 18/6677 |
| | | | 521/173 |
| 2013/0184369 | A1 * | 7/2013 | Kampf .................. C08G 18/14 |
| | | | 521/173 |
| 2013/0231410 | A1 * | 9/2013 | Jacobmeier ................ C08J 9/04 |
| | | | 521/116 |

(Continued)

FOREIGN PATENT DOCUMENTS

| EP | 1 138 709 A1 | 10/2001 |
| EP | 2 039 711 A1 | 3/2009 |

(Continued)

OTHER PUBLICATIONS

International Search Report dated Jan. 17, 2017 in PCT/EP2016/075749 filed Oct. 26, 2016.

*Primary Examiner* — Melissa A Rioja
(74) *Attorney, Agent, or Firm* — Oblon, McClelland, Maier & Neustadt, L.L.P.

(57) ABSTRACT

A polyol component b) comprising:
20 to 40 wt % of polyetherester polyols B) having a functionality of 3.8 to 4.8, an OH number of 380 to 440 mg KOH/g and a fatty acid and/or fatty acid ester content of 8 to 17 wt %, based on the weight of polyetherester polyols B);
20 to 40 wt % of polyether polyols C) having a functionality of 3.7 to 4 and an OH number of 300 to 420 mg KOH/g;
20 to 40 wt % of one or more polyether polyols D) having a functionality of 4.5 to 6.5 and an OH number of 400 to 520 mg KOH/g;
0.5 to 5.5 wt % of catalysts E),
0.1 to 5 wt % of further auxiliaries and/or added-substance materials F),
0.5 to 5 wt % of water G);
and also rigid polyurethane foams obtained therewith and use thereof for insulation and refrigeration applications.

10 Claims, No Drawings

(56) References Cited

U.S. PATENT DOCUMENTS

| | | | |
|---|---|---|---|
| 2014/0200327 A1* | 7/2014 | Koch | C08G 18/4883 |
| | | | 528/361 |
| 2015/0197611 A1* | 7/2015 | Albers | B29C 44/428 |
| | | | 521/94 |
| 2015/0259496 A1* | 9/2015 | Albers | C08G 18/4018 |
| | | | 521/131 |
| 2018/0282469 A1* | 10/2018 | Golini | C08G 18/1816 |

FOREIGN PATENT DOCUMENTS

| WO | WO 2013/127647 A1 | 9/2013 |
|---|---|---|
| WO | WO 2014/048777 A1 | 4/2014 |

\* cited by examiner

POLYETHERESTERS AND THEIR USE IN RIGID POLYURETHANE FOAMS

This application is a National Stage of PCT/EP2016/075749, which was filed on Oct. 26, 2016. This application is based upon and claims the benefit of priority to European Application No. 15191987.5, which was filed on Oct. 28, 2015.

This invention relates to a polyol component, to a process for preparing rigid polyurethane foams by using said polyol component and also to the rigid polyurethane foams themselves.

Rigid polyurethane (PU) foams are obtainable in a known manner by reacting organic polyisocyanates with one or more compounds having two or more reactive hydrogen atoms, preferably polyether and/or polyester alcohols (polyols), in the presence of blowing agents, catalysts and optionally auxiliaries and/or added-substance materials.

The isocyanate-based production of rigid PU foams typically utilizes polyols having high functionalities and a low molecular weight in order to ensure a very high degree of crosslinking for the foams. The preferably employed polyether alcohols usually have a functionality of 4 to 8 and a hydroxyl number in the range between 300 to 600, in particular between 400 and 500 mg KOH/g. It is known that polyols having a very high functionality and hydroxyl numbers in the range between 300 and 600 have a very high level of viscosity. It is further known that such polyols are comparatively polar and thus have poor solubility for customary blowing agents, in particular hydrocarbons such as pentanes, in particular cyclopentane. To remedy this defect, polyether alcohols having functionalities of 2 to 4 and hydroxyl numbers of 100 to 250 mg KOH/g are frequently added to the polyol component.

It is also known that the flowability (expressed by the flow factor FF=minimum fill density/free rise density) of the reaction mixture comprising isocyanate and polyol is not always satisfactory on use of polyol components based on high-functionality, polar polyols. But EP-A 1 138 709 discloses how reaction mixtures comprising isocyanate and polyol are obtainable with high flowability provided the polyol component comprises at least one polyether alcohol having a hydroxyl number of 100 to 250 mg KOH/g and obtained by addition of alkylene oxides onto H-functional starter molecules having 2 to 4 active hydrogen atoms, in particular glycols, trimethylolpropane, glycerol, pentaerythritol or vic-tolylenediamine (vic-TDA).

WO 2013/127647 A1 discloses polyetherester polyols obtained by the concurrent reaction of OH-functional starter molecules, fatty acids or fatty acid esters and alkylene oxides. These high-functionality polyetherester polyols possess low viscosity and a very high level of blowing agent compatibility. Therefore, such polyetherester polyols can be used in formulations at higher levels than customary for corresponding polyols in this hydroxyl number and functionality range. WO 2013/127647 A1 also describes formulations and/or polyol components comprising mixtures of such polyetherester polyols with polyether polyols, preferably those based on propoxylated tolylenediamine, that eschew any polyether alcohol having functionalities of 2 to 4 and hydroxyl numbers of 100 to 250 mg KOH/g as per EP-A 1 138 709 and nonetheless still possess sufficient solubility for hydrocarbon-based blowing agents such as pentanes, in particular cyclopentane, and have sufficient flowability when combined with the polyisocyanate into a reaction mixture.

However, the rigid PU foams obtainable according to the prior art described above cannot comply with all requirements. Particularly the formulations and/or polyol components described in WO 2013/127647 A1, which eschew any additional polyether alcohol having a functionality of 2 to 4 and hydroxyl numbers of 100 to 250 mg KOH/g as per EP-A 1 138 709, do not have the mechanical properties, in particular the compressive strength, needed for insulation and refrigeration applications. In addition, the demolding properties of the foam are also in need of further improvement.

EP 2 039 711 A1 discloses storage stabile polyol components comprising at least 25 wt.-% of a polyetherester polyol based on a natural oil and n-pentane. The fatty acid ester content of the polyetherester polyol is preferably 20 to 60 wt.-%. The polyol component can comprise further unspecified polyether-, polyester- and/or polycarbonate polyols etc. Explicitly disclosed is a polyol component which comprises 41.2 wt.-% of a polyetherester polyol (functionality 3.5), 16.47 wt.-% of a TDA started polyol and 24.72 wt.-% of a sucrose started polyol (OH-number 340). The compressive strength and often the demolding of PU-rigid foams obtained thereof are still in need of improvement.

The problem addressed by the present invention is therefore that of providing a polyol component for preparing rigid polyurethane foams that eschews any customarily employed polyether alcohol having a functionality of 2 to 4 and hydroxyl numbers of 100 to 250 mg KOH/g as per EP 1 138 709, that has a high solubility for customary physical blowing agents, in particular hydrocarbons such as pentanes and cyclopentane, and that also has good processing properties when combined with a di- or polyisocyanate into a reaction mixture. The polyol component/di- or polyisocyanate reaction mixture shall have good flowability, and enable rapid demolding of the foam while the rigid polyurethane foam obtained shall have improved mechanical properties, in particular an improved compressive strength.

The problem is surprisingly solved by the polyol component of the present invention.

The present invention accordingly provides a polyol component b) comprising (or consisting of): 20 to 40 wt % of one or more polyetherester polyols B) having a (mean) functionality of 3.8 to 4.8, preferably from 4.0 to 4.7, an OH number of 380 to 440, preferably 390 to 430 and more preferably 410 to 430 mg KOH/g, and a fatty acid and/or fatty acid ester content, preferably fatty acid methyl ester content, more preferably biodiesel and/or oleic acid methyl ester content, of 8 to 17 wt %, preferably 10 to 16 wt %, more preferably 11 to 15 wt %, based on the weight of polyetherester polyols B);

20 to 40 wt % of one or more polyether polyols C) having a (mean) functionality of 3.7 to 4; preferably 3.9 to 4; and an OH number of 300 to 420 and preferably of 350 to 410 mg KOH/g; 20 to 40 wt % of one or more polyether polyols D) having a (mean) functionality of 4.5 to 6.5; preferably 4.8 to 6.2; more preferably 5 to 6.1; and an OH number of 400 to 520, preferably 400 to 480 and more preferably 400 to 460 mg KOH/g;

0.5 to 5.5 wt % of one or more catalysts E), 0.1 to 5 wt % of further auxiliaries and/or added-substance materials F), 0.5 to 5 wt % of water G), wherein the sum total of components B), C), D), E), F) and G) is 100 wt %.

Polyetherester Polyols B)

Suitable polyetherester polyols B) comprise (consist of) the reaction product of i) 20 to 35 wt % of at least one hydroxyl-containing starter molecule;
ii) 8 to 17 wt %, preferably 10 to 16 wt %, more preferably 11 to 15 wt % of one or more fatty acids, fatty acid monoesters or mixtures thereof;
iii) 50 to 65 wt % of one or more alkylene oxides having 2 to 4 carbon atoms.

The starter molecules of component i) are generally selected such that the (mean) functionality of component i) is 3.8 to 4.8, preferably 4.0 to 4.7, more preferably 4.2 to 4.6. Optionally, a mixture of suitable starter molecules is used.

Preferred hydroxyl-containing starter molecules of component i) are selected from the group consisting of sugars and sugar alcohols (glucose, mannitol, sucrose, pentaerythritol, sorbitol), polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water.

Particular preference for use as component i) is given to sugars and sugar alcohols such as sucrose and sorbitol, glycerol, and also mixtures of said sugars and/or sugar alcohols with glycerol, water and/or glycols such as, for example, diethylene glycol and/or dipropylene glycol. Very particular preference is given to mixtures of sucrose with one or more than one—preferably one—compound selected from glycerol, diethylene glycol and dipropylene glycol. A mixture of sucrose and glycerol is very particularly preferred.

The proportion of polyetherester polyols B) employed according to the invention that is accounted for by starter molecule i) is generally in the range from 20 to 35 wt %, preferably in the range from 22 to 32 wt %, more preferably in the range from 24 to 30 wt % and most preferably in the range from 24 to 29 wt %, based on the weight of polyetherester polyol B).

Said fatty acid or fatty acid monoester ii) is generally selected from the group consisting of polyhydroxy fatty acids, ricinoleic acid, hydroxyl-modified oils, hydroxyl-modified fatty acids and fatty acid esters based in myristoleic acid, palmitoleic acid, oleic acid, stearic acid, palmitic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid. The fatty acid methyl esters are the preferred fatty acid monoesters. Preferred fatty acids are stearic acid, palmitic acid, linolenic acid and especially oleic acid, monoesters thereof, preferably methyl esters thereof, and also mixtures thereof. Fatty acids are preferably used as purely fatty acids. Very particular preference is given to using fatty acid methyl esters such as, for example, biodiesel or methyl oleate.

Biodiesel is to be understood as meaning fatty acid methyl esters within the meaning of the EN 14214 standard from 2010. Principal constituents of biodiesel, which is generally produced from rapeseed oil, soybean oil or palm oil, are methyl esters of saturated $C_{16}$ to $C_{18}$ fatty acids and methyl esters of mono- or polyunsaturated $C_{18}$ fatty acids such as oleic acid, linoleic acid and linolenic acid.

The fatty acid and fatty acid monoester content of polyetherester polyols B) employed according to the invention is generally in the range from 8 to 17 wt %, preferably in the range from 10 to 16 wt % and more preferably in the range from 11 to 15 wt %, based on the weight of polyetherester polyols B).

Suitable alkylene oxides iii) having 2 to 4 carbon atoms are, for example, ethylene oxide, tetrahydrofuran, propylene oxide, 1,2-butylene oxide, 2,3-butylene oxide and/or styrene oxide. Alkylene oxides can be used singly, alternatingly in succession or as mixtures. Preferred alkylene oxides are propylene oxide and ethylene oxide, while mixtures of ethylene oxide and propylene oxide that comprise >50 wt % of propylene oxide are particularly preferred; purely propylene oxide is very particularly preferred.

A preferred embodiment uses an amine, preferably dimethylethanolamine or imidazole, more preferably imidazole, as alkoxylation catalyst.

The proportion of polyetherester polyols B) employed according to the invention that is accounted for by alkylene oxides is generally in the range from 50 to 65 wt %, preferably in the range from 52 to 62 wt %, more preferably in the range from 55 to 61 wt % and most preferably in the range from 57 to 60 wt %, based on the weight of polyetherester polyols B).

Said polyetherester polyols B) employed according to the invention have a hydroxyl number (OH number) of 380 to 440 mg KOH/g, preferably 390 to 430 mg KOH/g, more preferably 410 to 430 mg KOH/g.

The (mean) functionality of polyetherester polyols according to the invention is generally in the range from 3.8 to 4.8, preferably from 4.0 to 4.7.

The proportion of polyetherester polyols B) is generally in the range from 20 to 40 wt %, preferably in the range from 25 to 35 wt % and more preferably in the range from 27 to 32 wt %, based on the sum total of components B) to G).

Polyether Polyols C)

Polyether polyols C) as used according to the invention are obtainable by known methods, for example by anionic polymerization with alkali metal hydroxides, e.g., sodium hydroxide or potassium hydroxide, or alkali metal alkoxides, e.g., sodium methoxide, sodium ethoxide, potassium ethoxide or potassium isopropoxide, as catalysts and by adding at least one amine-containing starter molecule, or by cationic polymerization with Lewis acids, such as antimony pentachloride, boron fluoride etherate and so on, or fuller's earth, as catalysts from one or more alkylene oxides having 2 to 4 carbon atoms in the alkylene moiety.

Starter molecules are generally selected such that their (mean) functionality is 3.7 to 4, preferably 3.8 to 4, more preferably 4. Optionally, a mixture of suitable starter molecules is used.

Useful starter molecules for polyether polyols C) include, for example, aliphatic and aromatic diamines such as ethylenediamine, 1,3-propylenediamine, 1,3-butylenediamine, 1,4-butylenediamine, 1,2-hexamethylenediamine, 1,3-hexamethylenediamine, 1,4-hexamethylenediamine, 1,5-hexamethylenediamine, 1,6-hexamethylenediamine, phenylenediamines, 2,3-tolylenediamine, 3,4-tolylenediamine, 2,4-tolylenediamine, 2,5-tolylenediamine and 2,6-tolylenediamine, 4,4'-diaminodiphenylmethane, 2,4'-diaminodiphenylmethane and 2,2'-diaminodiphenylmethane.

Useful starter molecules further include alkanolamines, e.g., ethanolamine, N-methylethanolamine and N-ethylethanolamine, dialkanolamines, e.g., diethanolamine, N-methyldiethanolamine and N-ethyldiethanolamine, and trialkanolamines, e.g., triethanolamine, and ammonia.

Particular preference is given to the abovementioned primary diamines, in particular vicinal TDA (vic-TDA) such as, for example, 2,3- and/or 3,4-tolylenediamine.

Suitable alkylene oxides having 2 to 4 carbon atoms are, for example, ethylene oxide, tetrahydrofuran, propylene oxide, 1,2-butylene oxide, 2,3-butylene oxide and/or styrene oxide. Alkylene oxides can be used singly, alternatingly in succession or as mixtures.

Preferred alkylene oxides are propylene oxide and/or ethylene oxide, while mixtures of ethylene oxide and propylene oxide that comprise >50 wt % of propylene oxide are particularly preferred; purely propylene oxide is very particularly preferred.

Said polyether polyols C), preferably polyoxypropylene polyols and/or polyoxyethylene polyols, have a functionality of preferably 3.7 to 4 and especially 3.9 to 4.

A particularly preferred embodiment of the invention uses a propoxylated tolylenediamine, in particular vic-tolylenediamine, as polyether polyol C).

The proportion of polyether polyols C) is generally in the range from 20 to 40 wt %, preferably in the range from 25 to 35 wt % and more preferably in the range from 27 to 32 wt %, based on the sum total of components B) to G).

Polyether Polyols D)

Polyether polyols D) as used according to the present invention are likewise prepared by known methods as described above for polyether polyols C) except that their anionic or cationic polymerization is carried out in the presence of at least one hydroxyl-containing starter molecule comprising 2 to 8, preferably 4 to 8 and more preferably 6 to 8 reactive hydrogen atoms in attached form.

Optionally, a mixture of suitable hydroxyl-containing starter molecules is used.

The hydroxyl-containing starter molecules for polyether polyols D) are preferably selected from the group consisting of sugars and sugar alcohols (glucose, mannitol, sucrose, pentaerythritol, sorbitol), polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water.

Particularly preferred starter molecules for the polyether polyols D) are the sugars and sugar alcohols such as sucrose and sorbitol, glycerol, and also mixtures of said sugars and/or sugar alcohols with glycerol, water and/or glycols such as, for example, diethylene glycol and/or dipropylene glycol. Very particular preference is given to mixtures of sucrose with one or more than one—preferably one—compound selected from glycerol, diethylene glycol and dipropylene glycol. A mixture of sucrose and glycerol is very particularly preferred.

Suitable alkylene oxides having 2 to 4 carbon atoms are, for example, ethylene oxide, tetrahydrofuran, propylene oxide, 1,2-butylene oxide, 2,3-butylene oxide and/or styrene oxide. Alkylene oxides can be used singly, alternatingly in succession or as mixtures.

Preferred alkylene oxides are propylene oxide and ethylene oxide, while mixtures of ethylene oxide and propylene oxide that comprise >50 wt % of propylene oxide are particularly preferred; purely propylene oxide is very particularly preferred.

Said polyether polyols D), preferably polyoxypropylene polyols and/or polyoxyethylene polyols, have a functionality of preferably 4.8 to 6.2 and especially 5 to 6.1.

A particularly preferred embodiment of the invention uses a propoxylated sucrose-glycerol mixture as polyether polyol D).

The proportion of polyether polyols D) is generally in the range from 20 to 40 wt %, preferably in the range from 25 to 35 wt % and more preferably in the range from 27 to 32 wt %, based on the sum total of components B) to G).

Catalyst E)

Compounds used as catalysts E) are particularly compounds having a substantial speeding effect on the reaction of the polyol component b) ingredients polyetherester polyols B) and polyether polyols C) and D) with the organic, optionally modified di- and/or polyisocyanates A) as per the hereinbelow described process of the present invention.

The compounds used as catalysts E) are advantageously polyurethane catalysts of the basic type, for example tertiary amines, such as triethylamine, tributylamine, dimethylbenzylamine, dicyclohexylmethylamine, dimethylcyclohexylamine, bis(2-dimethylaminoethyl) ether, bis(dimethylaminopropyl)urea, N-methylmorpholine, N-ethylmorpholine, N-cyclohexyl-morpholine, N,N,N',N'-tetramethylethylenediamine, N,N,N,N-tetramethylbutanediamine, N,N,N,N-tetramethylhexane-1,6-diamine, pentamethyldiethylenetriamine, dimethylpiperazine, N-dimethylaminoethylpiperidine, 1,2-dimethylimidazole, 1-azabicyclo(2.2.0)octane, 1,4-diazabicyclo(2.2.2)octane (Dabco), 1,8-diazabicyclo(5.4.0)undec-7-ene, and alkanolamine compounds, such as triethanolamine, triisopropanolamine, N-methyldiethanolamine, N-ethyldiethanolamine, dimethylaminoethanol, 2-(N,N-dimethylaminoethoxy)ethanol, N,N',N''-tris(dialkylaminoalkyl) hexahydrotriazines, e.g., N,N',N''-tris (dimethylaminopropyl)-s-hexahydrotriazine, and triethylenediamine. Also suitable, however, are metal salts, such as iron(II) chloride, zinc chloride, lead octoate and preferably tin salts, such as tin dioctoate, tin diethylhexoate and dibutyltin dilaurate.

Useful catalysts further include amidines, such as 2,3-dimethyl-3,4,5,6-tetrahydropyrimidine, tetraalkylammonium hydroxides, such as tetramethylammonium hydroxide, alkali metal hydroxides, such as sodium hydroxide, and alkali metal alkoxides, such as sodium methoxide and potassium isopropoxide, and also alkali metal salts of acids, in particular long-chain fatty acids having 10 to 20 carbon atoms and optionally pendant OH groups.

It is preferred to use a mixture of two or more of the aforementioned catalysts E). It is particularly preferred to use a catalyst mixture E) consisting of dimethylcyclohexylamine E1), pentamethyldiethylenetriamine E2), tris(dimethylaminopropyl)hexahydro-1,3,5-triazine E3) and dimethylbenzylamine E4).

The proportions for the individual catalysts in the aforementioned catalyst mixture consisting of catalysts E1) to E4) are preferably from 20 to 60 wt % for catalyst E1), from 10 to 50 wt % for catalyst E2), from 10 to 40 wt % for catalyst E3) and from 20 to 50 wt % for catalyst E4), subject to the proviso that the sum total of catalysts E1) to E4) is 100 wt %.

It is preferable to use from 1.0 to 5.5 wt %, particularly from 1.0 to 5.0 wt %, of one or more catalysts E), based on the weight of components B) to G).

When a comparatively large excess of polyisocyanate is used during the foaming process, the following come into consideration for use as catalysts for the trimerization reaction between the excess NCO groups: catalysts that form isocyanurate groups, examples being ammonium ion or alkali metal salts alone or combined with tertiary amines. Isocyanate formation leads to flame-resistant PIR foams which are preferably used as industrial rigid foam, for example as sandwich elements or insulation board in civil engineering.

Further particulars regarding the catalysts referred to are found in the technical literature, for example Kunststoff-handbuch, volume VII, Polyurethanes, Carl Hanser Verlag Munich, Vienna, 1st, 2nd and 3rd editions 1966, 1983 and 1993.

Auxiliary and/or Added-Substance Materials F)

Useful auxiliaries and/or added-substance materials F) for polyol component b) include, for example, surface-active substances such as emulsifiers, foam stabilizers and cell regulators, preferably foam stabilizers.

Useful surface-active substances include, for example, compounds that serve to augment the homogenization of the starting materials and are optionally also suitable for regulating the cell structure of the plastics. Suitable examples include emulsifiers, such as the sodium salts of castor oil sulfates or of fatty acids and also salts of fatty acids with amines, e.g., diethylamine oleate, diethanolamine stearate, diethanolamine ricinoleate, salts of sulfonic acids, e.g., alkali metal or ammonium salts of dodecylbenzene- or dinaphthylmethanedisulfonic acid and ricinoleic acid; foam stabilizers, such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators, such as paraffins, fatty alcohols and dimethylpolysiloxanes.

Polyol component b) preferably comprises foam stabilizers, in particular silicone-containing foam stabilizers such as siloxane-oxyalkylene copolymers and other organopolysiloxanes, as further auxiliary or as added-substance material F).

The aforementioned foam stabilizers are preferably employed in amounts of 0.5 to 4 wt %, more preferably 1 to 3 wt %, based on the weight of components B) to G).

Further particulars regarding the aforementioned and further suitable auxiliary and added-substance materials are found in the technical literature, for example the monograph by J. H. Saunders and K. C. Frisch "High Polymers" volume XVI, Polyurethanes, Parts 1 and 2, Interscience Publishers 1962 to 1964, respectively, or the Kunststoff-Handbuch, Polyurethanes, volume VII, Hanser-Verlag, Munich, Vienna, 1st and 2nd editions, 1966 and 1983.

Blowing Agents

Polyol component b) according to the present invention comprises with preference from 1 to 3 wt %, with particular preference from 1.5 to 3.0 wt % and with very particular preference from 2.0 to 3.0 wt % of water G), based on total polyol component b). Said water G) acts as a chemical blowing agent in the reaction mixture with the di- or polyisocycanates A).

The blowing agent for preparing the rigid polyurethane foams of the present invention utilizes water G) as a chemical blowing agent in combination with a physical blowing agent H). Said physical blowing agent H) may be added to the final polyol component b) of the present invention preferably directly prior to the foaming of said polyol component. The addition may take the form of a metered addition via a static mixer.

The amount used of physical blowing agent H) and/or of blowing agent mixture H) is from 10 to 20 parts by weight, preferably from 10 to 17 parts by weight, based on 100 parts by weight of polyol component b).

Suitable physical blowing agents H) are low-boiling liquids that are inert with regard to the organic, optionally modified di- or polyisocyanates A) and have boiling points below 100° C., preferably below 50° C. at atmospheric pressure, so that they vaporize under the influence of the exothermic polyaddition reaction. Examples of such low-boiling liquids, the use of which is preferred, are alkanes, such as heptane, hexane, n-pentane and iso-pentane, preferably technical grade mixtures of n- and iso-pentanes, n- and iso-butane and propane, cycloalkanes, such as cyclopentane and/or cyclohexane, ethers, such as furan, dimethyl ether and diethyl ether, ketones, such as acetone and methyl ethyl ketone, alkyl carboxylates, such as methyl formate, dimethyl oxalate and ethyl acetate. Mixtures of these low-boiling liquids with each other and/or with other substituted or unsubstituted hydrocarbons can also be used.

No halogenated hydrocarbons are preferably used as blowing agent H).

Preference for use as physical blowing agent H) is given to pentane isomers and/or cyclopentane, in particular cyclopentane.

The combination of water G) as chemical blowing agent with cyclopentane as physical blowing agent H) is particularly preferable.

Polyol component b) according to the invention preferably comprises (or consists of):
  25 to 35 wt % of polyetherester polyols B),
  25 to 35 wt % of polyether polyols C),
  25 to 35 wt % of polyether polyols D),
  1.0 to 5 wt % of catalysts E),
  0.1 to 5 wt % of auxiliaries and/or added-substance materials F), and also
  0.5 to 5 wt % of water G),
  wherein the sum total of components B) to G) is 100 wt %.

Polyol component b) according to the invention more preferably comprises (or consists of):
  25 to 35 wt % of polyetherester polyols B),
  25 to 35 wt % of polyether polyols C),
  25 to 35 wt % of polyether polyols D),
  1.0 to 5 wt % of catalysts E),
  0.5 to 4 wt % of auxiliaries and/or added-substance materials F), and also
  1.0 to 3 wt % of water G),
  wherein the sum total of components B) to G) is 100 wt %.

Polyol component b) according to the invention most preferably comprises (or consists of):
  27 to 32 wt % of polyetherester polyols B),
  27 to 32 wt % of polyether polyols C),
  27 to 32 wt % of polyether polyols D),
  1 to 3 wt % of catalysts E),
  1 to 3 wt % of auxiliaries and/or added-substance materials F), and also
  1.5 to 3 wt %, preferably 2.0 to 3.0 wt %, of water G),
  wherein the sum total of components B) to G) is 100 wt %.

A preferred embodiment utilizes a polyether polyol C) comprising a $C_2$-$C_4$-alkoxylated, preferably propoxylated, tolylenediamine and a polyether polyol D) comprising a $C_2$-$C_4$-alkoxylated, preferably propoxylated, sucrose/glycerol mixture.

In a further preferred embodiment, said polyetherester polyol B) comprises the reaction product of a sucrose/glycerol mixture with biodiesel or oleic acid methyl ester and one or more alkylene oxides having 2 to 4 carbon atoms, preferably propylene oxide.

The various embodiments can be combined with each other for the purposes of the present invention.

The invention further provides a process for preparing rigid polyurethane foams by reaction of I) organic or modified organic di- or polyisocyanates A) or mixtures thereof, with
II) a polyol component b) according to the invention after addition thereto of the blowing agent H).

Di- or polyisocyanates A)

Compounds useful as organic di- or polyisocyanates A) include the familiar aliphatic, cycloaliphatic, araliphatic di- or polyfunctional isocyanates and preferably the aromatic di- or polyfunctional isocyanates. Said organic di- or polyisocyanates may optionally be in a modified state.

Specific examples include alkylene diisocyanates having 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3-diisocyanate and cyclohexane 1,4-diisocyanate and also any desired mixtures thereof, 1-isocyanato-3,3,5-trimethyl-5-isocyanatomethylcyclohexane (IPDI), 2,4- and 2,6-hexahydrotolylene diisocyanate and also the corresponding isomeric mixtures, 4,4'-, 2,2'- and 2,4'-dicyclohexylmethane diisocyanate and also the corresponding isomeric mixtures, and preferably aromatic di- and polyisocyanates, for example 2,4- and 2,6-tolylene diisocyanates and the corresponding isomeric mixtures, 4,4'-, 2,4'- and 2,2'-diphenylmethane diisocyanate and the corresponding isomeric mixtures, mixtures of 4,4'- and 2,2'-diphenylmethane diisocyanates, polyphenyl polymethylene polyisocyanates, mixtures of 2,4'-, 2,4'- and 2,2'-diphenylmethane diisocyanates and polyphenyl polymethylene polyisocyanates (crude MDI) and mixtures of crude MDI and tolylene diisocyanates. Organic di- or polyisocyanates are employable singly or in the form of their mixtures.

Preferred polyisocyanates are tolylene diisocyanate (TDI), diphenylmethane diisocyanate (MDI) and especially mixtures of diphenylmethane diisocyanate and polyphenylene polymethylene polyisocyanates (polymer MDI or PMDI).

Modified di- or polyfunctional isocyanates, i.e., products obtained by converting organic polyisocyanates chemically, are frequently also used. Examples are polyisocyanates comprising ester, urea, biuret, allophanate, carbodiimide, isocyanurate, uretdione, carbamate and/or urethane groups.

A very particularly preferred way to prepare the rigid polyurethane foams of the present invention involves using polymer MDI, e.g., Lupranat® M20 from BASF SE.

To prepare the rigid polyurethane foams of the present invention, the optionally modified organic di- and/or polyisocyanates A) and polyol component b) of the present invention are reacted with the additionally added physical blowing agent H) in such amounts that the isocyanate index is from 70 to 300, preferably from 90 to 200, more preferably from 100 to 150.

The rigid polyurethane foams are advantageously obtained via the one shot process, for example using high pressure or low pressure technology in open or closed molds, for example metallic molds. Another customary way is to apply the reaction mixture in a continuous manner to suitable belt lines to produce panels.

The starting components are mixed at a temperature of from 15 to 90° C., preferably from 20 to 60° C. and especially from 20 to 35° C. and the mixture is introduced into an open mold or, optionally under superatmospheric pressure, into a closed mold. Mixing is typically carried out in a high pressure mixing head. Mold temperature is advantageously from 20 to 110° C., preferably from 30 to 70° C. and especially from 40 to 60° C.

Rigid PU foams obtained by the process of the present invention are a further aspect of the invention.

The rigid polyurethane foams obtained by the process according to the invention generally have a free rise density of from 10 to 100 g/l, preferably from 15 to 50 g/l and especially from 20 to 40 g/l.

The invention further provides the method of using the rigid polyurethane foams obtained by the process according to the invention for insulation and refrigeration applications.

The invention is more particularly elucidated by the examples which follow.

EXAMPLES

Methods of Measurement:

Measurement of Hydroxyl Number: Hydroxyl numbers were determined according to DIN 53240 (1971-12).

Viscosity Determination:

Unless otherwise stated, polyol viscosity was determined at 25° C. in accordance with DIN EN ISO 3219 (1994) using a Rheotec RC 20 rotary viscometer and the CC 25 Din spindle (spindle diameter: 12.5 mm, measuring cylinder inside diameter: 13.56 mm) at a shear rate of 50 1/s.

Determination of Pentane Solubility:

To evaluate its pentane solubility, polyol component b) is mixed (Vollrath stirrer, 1500 rpm, 2 min stirring time) with the amount which was reported in the examples for physical blowing agent H), and the mixture is poured into a screw-top jar which is then closed. Following complete escapage of gas bubbles, sample clarity is initially assessed at room temperature. If the sample is clear, it is subsequently cooled down in a water bath in increments of 1° C. and assessed for clarity 30 min after reaching the temperature setting.

Determination of Demolding Behavior:

Demolding behavior was determined by measuring the postexpansion of foam bodies produced using a 700×400×90 mm box mold at a mold temperature of 45±2° C. as a function of demolding time and the degree of overpacking (OP), which corresponds to the ratio of overall apparent density/minimum fill density. Postexpansion was determined by measuring the foam cuboids after 24 h.

Minimum Fill Density for a Component Part/Free Rise Density:

Minimum fill density is determined by importing just sufficient polyurethane reaction mixture into a mold measuring 2000×200×50 mm at a mold temperature of 45±2° C. to just fill the mold. Free rise density is determined by allowing the foaming polyurethane reaction mixture to expand in a plastic bag at room temperature. The density is determined on a cube removed from the center of the foam-filled plastic bag.

Determination of Flowability:

The flowability is reported in terms of the flow factor= (minimum fill density/free rise density).

Thermal Conductivity:

Thermal conductivity was determined using a Taurus TCA300 DTX at a midpoint temperature of 10° C. To prepare the test specimens, the polyurethane reaction mixture was imported into a 2000×200×50 mm mold with 15% overpacking and demolded 5 min later. After aging for 24 hours under standard conditions, several foam cuboids (at positions 10, 900 and 1700 mm on the lower end of the Brett molding) measuring 200×200×50 mm are cut out of the center. The top and bottom sides were then removed to obtain test specimens measuring 200×200×30 mm.

Compressive Strength:

Compressive strength was determined according to DIN ISO 844 EN DE (2014-11).

EXAMPLES

Starting Materials:

Biodiesel as per the EN 14214 (2010) standard

Preparation of Polyether Polyol C

A 600 l pressure reactor equipped with stirrer, jacket heating and cooling, metering devices for solid and liquid substances and alkylene oxides and also devices for nitrogen inertization and a vacuum system was heated up to 80° C. and repeatedly inertized. 120.2 kg of vicinal tolylenediamine were introduced into the reactor and the stirrer was switched on. Then, the reactor was inertized once more and the temperature was raised to 130° C. and 160.06 kg of propylene oxide were metered in. Following a reaction of 2 h, the temperature was lowered to 100° C. and 4.29 kg of dimethylethanolamine were added. The intermediate product was reacted with a further 233.97 kg of propylene oxide. The postreaction ran for 2 hours at 100° C. to obtain 508.6 kg of product having the following parameters:

| OH number | 399 mg KOH/g |
|---|---|
| Viscosity (at 25° C.) | 17016 mPas |

Preparation of Polyether Polyol D3

A reactor as described above for polyether polyol C) was charged with 21.20 kg of glycerol, 136.49 kg of sucrose and 1.03 kg of an aqueous imidazole solution (50 weight percent in water). The stirrer was started and the reactor was repeatedly inertized and heated to 120° C. Then, 361.1 kg of propylene oxide were metered into the reactor. The postreaction of 2 hours proceeded at 120° C. The propylene oxide still present was stripped off in a stream of nitrogen. The product (498.3 kg) had the following parameters:

| OH number | 432 mg KOH/g |
|---|---|
| Viscosity (at 25° C.) | 26871 mPas. |

Preparation of Polyetherester Polyol B1

53.60 kg of glycerol, 0.47 kg of an aqueous imidazole solution (50 weight percent), 90.53 kg of sucrose and 70.24 kg of biodiesel were charged at 25° C. to a reactor as described above for polyether polyol C). The reactor was subsequently inertized with nitrogen three times. The tank was heated to 130° C. and 305.41 kg of propylene oxide were metered in. Following a reaction time of 3 h, the reactor was evacuated to a full vacuum at 100° C. for 60 minutes and then cooled down to 25° C. to obtain 502.4 kg of product.

| OH number | 415 mg KOH/g |
|---|---|
| Viscosity (at 25° C.) | 3215 mPas |

Acid number: 0.01 mg KOH/g

The following components were converted into polyols similarly to the above methods of synthesis (all particulars in wt %):

Polyol B1: polyetheresterol based on sucrose 17.4%, glycerol 10.3%, propylene oxide (PO) 58.7% and biodiesel 13.5%, OH number 415 mg KOH/g;

Polyol B2 (not in accordance with the present invention): polyetheresterol based on sucrose 12.04%, glycerol 12.7%, propylene oxide (PO) 41.2% and methyl oleate 25.6%, OH number 489 mg KOH/g;

Polyol C: polyetherol based on vic-TDA and PO, OH number 399 mg KOH/g;

Polyol X1 (not in accordance with the present invention): polyetherol based on vic-TDA, ethylene oxide (EO) and PO, OH number 160 mg KOH/g.

Polyol X2 (not in accordance with the present invention): polyetherol based on glycerol and PO, OH number 160 mg KOH/g.

Polyol X3 (not in accordance with the present invention): polyetherol based on sucrose, OH number 340 mg KOH/g analogous to Multranol 9171 from Covestro (used as polyol Z in EP 2 029 711 A1).

Polyol X4: polyetherol based on vic-TDA, analogous to Multranol 8120 from Covestro (used as polyol Y in EP 2 029 711 A1).

Polyol D1: polyetherol based on sucrose, glycerol and PO, OH number 450 mg KOH/g, functionality: 5.0.

Polyol D2: polyetherol based on sucrose, glycerol and PO, OH number 411 mg KOH/g, functionality: 6.0.

Polyol D3: polyetherol based on sucrose, glycerol and PO, OH number 432 mg KOH/g, functionality: 6.0.

Stabilizer F): silicone-containing foam stabilizer, Tegostab® B8474 and/or Tegostab® B8491 from Evonik Catalyst mixture E) consisting of:

catalyst E1): dimethylcyclohexylamine catalyst E2): pentamethyldiethylenetriamine catalyst E3): tris(dimethylaminopropyl)hexahydro-1,3,5-triazine catalyst E4): dimethylbenzylamine The aforementioned catalyst mixture E) was used in Examples 1 to 3 and in Comparative Examples 1, 2, 4 and 5 (see table 1). The catalyst mixture of Comparative Example 3 (as per WO 2013/127647, table 2, Example 3) only contains the catalysts E1), E2) and E3).

Isocyanate: polymer MDI having an NCO content of 31.5 wt % (Lupranat® M20)

The aforementioned raw materials were used to prepare a polyol component (all particulars in wt %) which was mixed with a physical blowing agent before foaming. A PU 30/80 IQ high pressure Puromat® (Elastogran GmbH) operating at an output rate of 250 g/s was used to mix the polyol component, which had been admixed with the physical blowing agent, with the requisite amount of the reported isocyanate to obtain an isocyanate index (unless otherwise stated) of 117. The reaction mixture was injected into molds temperature regulated to 40° C. and measuring 2000 mm×200 mm×50 mm and/or 400 mm×700 mm×90 mm and allowed to foam up therein. Overpacking was 14.5%, i.e., 14.5% more reaction mixture than needed to completely foam out the mold was used.

Table 1 shows the measured results for the particular composition of the polyol component (PC) b) (particulars in wt %) and the foams resulting therefrom. The amount of physical blowing agent (cyclopentane) is reported in the parts by weight added to 100 parts by weight of the polyol component.

TABLE 1

|  | Ex. 1 | Ex. 2 | Ex. 3 | Comp. Ex. 1 | Comp. Ex. 2* | Comp. Ex. 3* | Comp. Ex. 4* | Comp. Ex. 5* |
|---|---|---|---|---|---|---|---|---|
| polyol B1 | 31.5 | 31.5 | 31.5 | 28.6 | 0 |  | 31.5 | 46.0 |
| polyol B2 | 0 | 0 | 0 | 0 | 0 | 60 | 0 | 0 |
| polyol D1 | 31.0 | 0 | 0 | 29.0 | 56.0 | 0 | 0 | 0 |
| polyol C | 30.0 | 30.0 | 30.0 | 30.0 | 23.0 | 30 | 30.0 | 0 |
| polyol X1 | 0 | 0 | 0 | 5.0 | 0 | 0 | 0 | 0 |
| polyol D2 | 0 | 31.0 | 0 | 0 | 0 | 0 | 0 | 0 |
| polyol D3 | 0 | 0 | 31.0 | 0 | 0 | 0 | 0 | 0 |
| polyol X2 | 0 | 0 | 0 | 0 | 13.5 | 0 | 0 | 0 |
| polyol X3 | 0 | 0 | 0 | 0 | 0 | 0 | 31.0 | 28 |
| polyol X4 | 0 | 0 | 0 | 0 | 0 | 0 | 0 | 18.5 |
| stabilizer | 2.8 | 2.8 | 2.8 | 2.8 | 2.8 | 2.75 | 2.8 | 2.8 |
| H$_2$O | 2.6 | 2.6 | 2.6 | 2.6 | 2.6 | 2.55 | 2.6 | 2.6 |
| catalyst mixture | 2.1 | 2.1 | 2.1 | 2.0 | 2.1 | E1) 0.44 E2) 0.71 E3) 0.35 | 2.1 | 2.1 |
| Sum total | 100 | 100 | 100 | 100 | 100 |  | 100 | 100 |
| Cyclopentan 95 (CP 95) | 13.5 | 13.5 | 13.5 | 13.5 | 13.5 | 13 | 13.5 | 13.5 |
| NCO index | 117 | 117 | 117 | 117 | 117 | 118 | 117 | 117 |
| fiber time [s] | 41 | 42 | 40 | 42 | 41 | 37 | 40 | 41 |
| free rise density [g/L] | 22.6 | 22.5 | 22.7 | 22.2 | 22.0 | 23.4 | 21.8 | 22.7 |
| PC stability with CP 95 at RT | clear | clear | clear | clear | clear | clear | clear | clear |
| PC stability with CP 95 at 6° C. | clear | clear | clear | clear | clear | clear | clear | clear |
| postexpansion [%] 14.5% over-packing [%] |  |  |  |  |  |  |  |  |
| 3 min | 4.0 | 3.6 | 2.8 | 4.2 | 4.0 | 3.11 | 3.6 | 4.3 |
| 4 min | 2.3 | 2.0 | 1.5 | 2.5 | 2.6 | 1.78 | 2.1 | 2.8 |
| compressive strength [N/mm$^2$] at 31 g/L density | 0.157 | 0.155 | 0.157 | 0.143 | 0.148 | 0.144 | 0.149 | 0.143 |

*= Comparative Example 2 corresponds to EP-A 1 138 709.
*= Comparative Example 3 corresponds to WO 2013/127647 A1.
*= Comparative Examples 4 and 5 correspond to EP 2 039 711 A1.

Comparative Example 1 (Comp. Ex. 1) shows a polyol component formulation which is not in accordance with the present invention in comprising polyols B1, C and D1, which are used in accordance with the present invention, and additionally a polyether alcohol X1 having a functionality of 4 and a hydroxyl number of 160 mg KOH/g. The rigid PU foams obtained are inferior to those obtained in Example 1 in demolding and also, by ~9%, in compressive strength.

Comparative Example 2 shows a customary refrigerator formulation comprising a polyether alcohol X2 having a functionality of 4 and a hydroxyl number of 160 mg KOH/g as per EP 1 138 709 A1. Comparing the rigid PU foams obtained, it is clear that the products as per Example 1 have a 6% improved compressive strength and also improved demolding at 4 min.

Comparative Example 3 used a formulation of a polyol component as per Example 3 of WO 2013/127647 A1, comprising a polyetheresterol B2, which was not in accordance with the present invention, and a polyetherol C. The compressive strength of the rigid PU foam obtained is 6-8% worse than that of the product from Examples 1 to 3.

The formulations of the polyol components in Examples 2 and 3 utilized respectively polyetherols D2 and D3, based on sucrose-glycerol and having a higher functionality. The rigid PU foams obtained are notable for better demolding in particular.

Comparative Example 4 used a formulation of a polyol component, comprising beside polyols B) and C), which are used in accordance with the present invention, polyol X3—analogous to polyol Z (Multranol 9171) as per EP-A 2 039 711—which is not used in accordance with the present invention. The compressive strength of the rigid PU foam obtained is 4 to 5% worse than that of the product from Examples 1 to 3. The rigid PU foams obtained are also inferior to those obtained in Examples 2 and 3 in demolding.

Comparative Example 5 shows a formulation of a polyol component comprising polyol B1) which is used in accordance with the present invention, and polyols X3 and X4 which are analogous to polyols Z (Multranol 9171) and Y (Multranol 8120) as per EP-A 2 039 711 (cp. Example 7). The rigid PU foams obtained are inferior to those obtained in Examples 1 to 3 in demolding and also, by 8 to 9%, in compressive strength.

The invention claimed is:

1. A polyol component, comprising:
   25 to 35 wt % of one or more polyetherester polyols B) having a mean functionality of 3.8 to 4.8, an OH number of 380 to 440 mg KOH/g, and a content of units derived from a fatty acid and/or a fatty acid ester of 8 to 17 wt %, based on a total weight of the one or more polyetherester polyols B);
   25 to 35 wt % of one or more polyether polyols C) having a mean functionality of 3.7 to 4 and an OH number of 300 to 420 mg KOH/g;
   25 to 35 wt % of one or more polyether polyols D) having a mean functionality of 4.5 to 6.5 and an OH number of 400 to 520 mg KOH/g;
   1.0 to 5 wt % of one or more catalysts E);
   0.1 to 5 wt % of auxiliaries and/or additive materials F); and
   0.5 to 5 wt % of water G),
   wherein a sum total of the amounts of components B), C), D), E), F) and G) is 100 wt %.

2. The polyol component according to claim 1, wherein:
   the one or more polyetherester polyols B) have a mean functionality of 4.0 to 4.7, an OH number of 390 to 430, and the content of the units derived from the fatty acid and/or the fatty acid ester is 10 to 16 wt %, based on the total weight of the one or more polyetherester polyols B);

the one or more polyether polyols C) have a mean functionality of 3.9 to 4.1 and an OH number of 350 to 410 mg KOH/g; and one or more polyether polyols D) have a mean functionality of 4.8 to 6.2 and an OH number of 400 to 480 mg KOH/g.

3. The polyol component according to claim 1, wherein:

the one or more polyetherester polyols B) have a mean functionality of 4.0 to 4.7, an OH number of 410 to 430, and a content of units derived from the fatty acid and/or the fatty acid ester of 11 to 15 wt % based on the total weight of the one or more polyetherester polyols B).

4. The polyol component according to claim 1, wherein:

at least one of the one or more polyether polyols C) is an alkoxylated tolylenediamine and at least one of the one or more polyether polyols D) is an alkoxylated sucrose-glycerol mixture.

5. The polyol component according to claim 1, wherein:

at least one of the one or more polyetherester polyols B) comprises the reaction product of a sucrose-glycerol starter mixture with biodiesel or oleic acid methyl ester and one or more alkylene oxides having 2 to 4 carbon atoms.

6. The polyol component according to claim 1, comprising:

27 to 32 wt % of the one or more polyetherester polyols B), 27 to 32 wt % of the one or more polyether polyols C), al 27 to 32 wt % of the one or more polyether polyols D), 1 to 3 wt % of the one or more catalysts E), 1 to 3 wt % of the auxiliary and/or the additive materials F), and 1.5 to 3 wt % of the water G), wherein the sum total of the amounts of components B) to G) is 100 wt %.

7. A process for preparing a rigid polyurethane foam, the process comprising:

adding a physical blowing agent H) the polyol component of claim 1, to obtain an isocyanate-reactive mixture; and then reacting organic or modified organic di- or polyisocyanates or mixtures thereof, with the isocyanate-reactive mixture to obtain the rigid polyurethane foam.

8. A rigid polyurethane foam obtained by the process according to claim 7.

9. A rigid polyurethane foam formed with the polyol component according to claim 1.

10. An insulation or refrigeration composition, comprising the rigid polyurethane foam according to claim 8.

* * * * *